US012094147B2

(12) United States Patent
Hong et al.

(10) Patent No.: US 12,094,147 B2
(45) Date of Patent: Sep. 17, 2024

(54) ESTIMATING A THICKNESS OF CORTICAL REGION BY EXTRACTING A PLURALITY OF INTERFACES AS MESH DATA

(71) Applicant: VUNO Inc., Seoul (KR)

(72) Inventors: Eunpyeong Hong, Gyeonggi-do (KR); Wonmo Jung, Seoul (KR); Sejin Park, Gyeonggi-do (KR); Hyunwoo Oh, Seoul (KR); Dong Soo Lee, Seoul (KR); Weon Jin Kim, Seoul (KR); Jinkyeong Sung, Seoul (KR)

(73) Assignee: VUNO Inc., Seoul (KR)

( * ) Notice: Subject to any disclaimer, the term of this patent is extended or adjusted under 35 U.S.C. 154(b) by 390 days.

(21) Appl. No.: 17/509,590

(22) Filed: Oct. 25, 2021

(65) Prior Publication Data

US 2022/0130065 A1   Apr. 28, 2022

(30) Foreign Application Priority Data

Oct. 26, 2020 (KR) .................. 10-2020-0139713

(51) Int. Cl.
*G06T 7/62* (2017.01)
*G06T 7/00* (2017.01)
*G06T 17/20* (2006.01)

(52) U.S. Cl.
CPC .............. *G06T 7/62* (2017.01); *G06T 7/0012* (2013.01); *G06T 17/20* (2013.01); *G06T 2207/10081* (2013.01); *G06T 2207/10088* (2013.01); *G06T 2207/20081* (2013.01); *G06T 2207/20084* (2013.01)

(58) Field of Classification Search
CPC ......... G06T 7/62; G06T 7/0012; G06T 17/20; G06T 2207/10081; G06T 2207/10088; G06T 2207/20081; G06T 2207/20084; G06T 2207/30016; G06T 7/13; G06T 2207/20108; A61B 5/4064; A61B 5/0033; A61B 5/055; A61B 5/4088; G06N 3/08; G16H 30/40; G16H 50/20
See application file for complete search history.

(56) References Cited

U.S. PATENT DOCUMENTS

| | | | |
|---|---|---|---|
| 9,008,394 B2 | 4/2015 | Lin et al. | |
| 10,238,329 B2 | 3/2019 | Bansal et al. | |
| 2008/0170791 A1* | 7/2008 | Eskildsen | G06T 7/12 382/199 |

(Continued)

FOREIGN PATENT DOCUMENTS

KR   10-2017-0116100 A   10/2017

OTHER PUBLICATIONS

"Brain Magnetic Resonance Imaging Using Deep Learning Quantitative Analysis Techniques" to Park Se-jin, et al. Vuno Inc.,: pp. 27-34, 2017.*

(Continued)

*Primary Examiner* — Christopher Wait
(74) *Attorney, Agent, or Firm* — Seed IP Law Group LLP

(57) ABSTRACT

Disclosed is a method for analyzing a thickness of a cortical region, performed by a computing device. The method may include: extracting a plurality of interfaces included in a cortical region based on a mask generated from a medical image including at least one brain region; and estimating a thickness of the cortical region based on the plurality of interfaces.

14 Claims, 5 Drawing Sheets

(56) References Cited

U.S. PATENT DOCUMENTS

2010/0130848 A1* 5/2010 Lin .................. A61B 5/055
600/410
2016/0292847 A1 10/2016 Liu et al.
2017/0046849 A1 2/2017 Rivet-Sabourin

OTHER PUBLICATIONS

Osechinskiy et al., "Cortical Surface Reconstruction from High-Resolution MR Brain Images," *International Journal of Biomedical Imaging*, 2012: 19 pages, Feb. 1, 2012.

Lorensen et al., "Marching Cubes: A High Resolution 3D Surface Construction Algorithm," *Computer Graphics*, 21(4):163-169, Jul. 31, 1987.

Rebsamen et al., "Direct cortical thickness estimation using deep learning-based anatomy segmentation and cortex parcellation," *Hum Brain Mapp.*, 41: 4804-4814, Aug. 12, 2020.

Lee et al., "A Novel Quantitative Validation of the Cortical Surface Reconstruction Algorithm Using MRI Phantom: Issues on Local Geometric Accuracy and Cortical Thickness," *MICCAI*, 4190:183-190, 2006.

Park et al., "Quantitative Analysis of Brain Magnetic Resonance Imaging Using Deep Learning," *Vuno Inc.*,: pp. 27-34, 2017. (with English translation).

* cited by examiner

ESTIMATING A THICKNESS OF CORTICAL REGION BY EXTRACTING A PLURALITY OF INTERFACES AS MESH DATA

CROSS-REFERENCE TO RELATED APPLICATIONS

This application claims priority to and the benefit of Korean Patent Application No. 10-2020-00139713 filed in the Korean Intellectual Property Office on Oct. 26, 2020, the entire contents of which are incorporated herein by reference.

BACKGROUND

Technical Field

The present disclosure relates to a method of processing a medical image, and more particularly, to a method of analyzing a thickness of a cortical region existing in a medical image by using a neural network.

Description of the Related Art

Medical images are data that enables people to understand physical states of various organs in the human body. The medical image includes a digital radiographic image (X-ray), a Computed Tomography (CT) image, a Magnetic Resonance Imaging (MM) image, or the like.

Information on a thickness of a cortical region is used as useful information for diagnosing Alzheimer's disease, such as brain volume atrophy. A change in the thickness of the cortical region in the Alzheimer's disease may be initiated earlier than brain volumetric atrophy, which may be a more important biomarker for early diagnosis. That is, it can be considered that accurately analyzing and determining the information on the thickness of the cortical region plays an important role in improving the diagnosis accuracy of Alzheimer's disease.

Various brain analysis software developed in the related art basically supports a function of calculating a thickness of a cortical region. In the case of the disease, such as Alzheimer's disease, for which early diagnosis is important, it is important to accurately and quickly secure indicators for a diagnosis.

U.S. Pat. No. 9,008,394 discloses a device and a method of determining a thickness of a brain cortex.

BRIEF SUMMARY

The inventors of the present disclosure have recognized that the brain analysis software in the related art has a problem in that it takes a considerable time (for example, 20 hours or more) to perform the function of calculating the thickness of a cortical region. One or more embodiments have been provided by the inventors to address one or more technical problems in the related art including the above-mentioned problem identified by the inventors. Accordingly, the embodiments provided herein by the inventors can accurately and quickly analyze a thickness of a cortical region compared to those methods in the related art.

The present disclosure provides a method of analyzing a thickness of a cortical region based on a medical image of a body.

In particular, an embodiment of the present disclosure discloses a method for analyzing a thickness of a cortical region, performed by a computing device. The method may include: extracting a plurality of interfaces included in a cortical region based on a mask generated from a medical image including at least one brain region; and estimating a thickness of the cortical region based on the plurality of interfaces.

In an alternative embodiment, the method may further include generating the mask including the cortical region from the medical image using a pre-trained parcellation model.

In the alternative embodiment, the parcellation model may be a convolutional neural network trained by receiving at least one two-dimensional slice generated from a three-dimensional image.

In the alternative embodiment, the plurality of interfaces may include: a first interface indicating a boundary between gray matter and white matter in the cortical region; and a second interface indicating a boundary between the gray matter and cerebrospinal fluid in the cortical region.

In the alternative embodiment, the extracting of the plurality of interfaces included in the cortical region may further include extracting each of the plurality of interfaces as mesh data including a vertex and an edge based on the mask.

In the alternative embodiment, the mesh data is extracted using a marching cubes algorithm.

In the alternative embodiment, the estimating of the thickness of the cortical region based on the plurality of interfaces may further include estimating the thickness of the cortical region based on a distance between vertices included in each of the plurality of interfaces.

In the alternative embodiment, the estimating of the thickness of the cortical region based on the distance between the vertices may include: calculating a distance to the nearest vertex included in the other interface for each of vertices included in one interface; and estimating the thickness of the cortical region based on the result of the calculation.

Further embodiments of the present disclosure discloses a computer program stored in a computer readable storage medium. The computer program, when executed on one or more processors, causes the following operations to be performed for analyzing a thickness of a cortical region, and the operations may include extracting a plurality of interfaces included in a cortical region based on a mask generated from a medical image including at least one brain region; and estimating a thickness of the cortical region based on the plurality of interfaces.

Another embodiment of the present disclosure discloses a device for analyzing a thickness of a cortical region. The device may include: a processor including at least one core; a memory including program codes executable in the processor; and a network unit for receiving a medical image including at least one brain region, in which the processor may be configured to: extract a plurality of interfaces included in a cortical region based on a mask generated from the medical image including at least one brain region; and estimate a thickness of the cortical region based on the plurality of interfaces.

DETAILED DESCRIPTION

Figure 1:
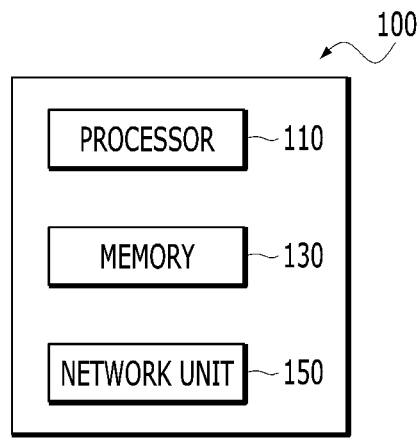
FIG. 1 is a block diagram illustrating a computing device for analyzing a thickness of a cortical region according to an embodiment of the present disclosure.

Various embodiments will now be described with reference to drawings. In the present specification, various descriptions are presented to provide appreciation of the present disclosure. However, it is apparent that the embodiments can be executed without the specific description.

"Component," "module," "system," and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A," "a case including only B," and "a case in which A and B are combined."

Those skilled in the art should readily recognize that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

Hereinafter, embodiments of the present disclosure will be described in more detail with reference to drawings. However, the present disclosure may be embodied as a lot of various forms, and should not be construed as being restricted to the embodiments described herein.

In the meantime, the term "image" or "image data" used throughout the detailed description and the claims of the present disclosure refer to multidimensional data composed of discrete image elements (for example, pixels in a 2-dimensional image), and in other words, is the term referring to a target visible to the eye (for example, displayed on a video screen) or a digital representation of the target (for example, a file corresponding to a pixel output of a CT or MRI detector).

For example, "image" or "video" may be a medical image of a subject collected by Computed Tomography (CT), Magnetic Resonance Imaging (MRI), ultrasonic rays, or other predetermined medical imaging systems publicly known in the art of the present disclosure. The image is not necessarily provided in a medical context, but may also be provided in a non-medical context, such as X-ray imaging for security screening.

Throughout the detailed description and the claims of the present disclosure, the "Digital Imaging and Communications in Medicine (DICOM)" standard is a term collectively referring to various standards used in digital imaging expression and communication in medical devices, and the DICOM standard is published by the allied committee formed by the American College of Radiology (ACR) and American National Electrical Manufacturers Associations (NEMA).

Throughout the detailed description and the claims of the present disclosure, a "Picture Archiving and Communication System (PACS)" is a term that refers to a system that stores, processes, and transmits images in accordance with the DICOM standard, and medical images obtained by using digital medical imaging equipment, such as X-ray, CT, and MRI, may be stored in the DICOM format and transmitted to terminals inside and outside a hospital through a network, and a reading result and a medical record may be added to the medical image.

FIG. 1 is a block diagram illustrating a computing device for analyzing a thickness of a cortical region according to an embodiment of the present disclosure.

The configuration of a computing device 100 illustrated in FIG. 1 is merely a simplified example. In the embodiment of the present disclosure, the computing device 100 may include other configurations for performing a computing environment of the computing device 100, and only some of the disclosed configurations may also configure the computing device 100.

The computing device 100 may include a processor 110, a memory 130, and a network circuit 150 (or may be referred to as a network unit 150).

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning. The processor 110 may read a computer program stored in the memory 130 and process data for machine learning according to an embodiment of the present disclosure. According to the embodiment of the present disclosure, the processor 110 may perform calculation for training a neural network. The processor 110 may perform a calculation, such as processing of input data for training in Deep Learning (DL), extraction of a feature from input data, an error calculation, and updating of a weight of the neural network by using backpropagation, for training the neural network. At least one of the CPU, GPGPU, and TPU of the processor 110 may process training of a network function. For example, the CPU and the GPGPU may process training of the network function and data classification by using a network function together. Further, in the embodiment of the present disclosure, the training of the network function and the data classification by using a network function may be processed by using the processors of the plurality of computing devices together. Further, the computer program executed in the computing device according to the embodiment of the present disclosure may be a CPU, GPGPU, or TPU executable program.

The processor 110 may analyze a thickness of a cortical region based on a mask generated from a medical image including one or more brain regions received through the network unit 150. In this case, the mask may be data processed from the medical image and including a specific brain region. For example, the mask may be a three-dimensional image which is processed from a three-dimensional T1 MR image displaying the whole brain region and in which a cortical region is emphasized, or a set of two-dimensional slices generated from the three-dimensional image. The processor 110 may perform processing on the medical image in order to generate the mask. The processor 110 may also receive the mask itself extracted from the medical image, not the medical image, through the network unit 150.

The processor 110 may extract the plurality of interfaces included in the cortical region from the mask in order to analyze a thickness of the cortical region. The processor 110 does not use the method of calculating accurate positions with respect to other interfaces by using various information included in the medical image based on one interface of the cortical region, like the existing brain analysis software. The processor 110 may individually extract the interfaces of the cortical region included in the mask at the same time, thereby considerably reducing time and cost taken for extracting the interface. The particular interface extracting method will be described below with reference to FIGS. 2 and 3.

The processor 110 may estimate a thickness of the cortical region based on the plurality of interfaces included in the cortical region in order to analyze the thickness of the cortical region. Due to the nature of the organ of the brain, the boundaries of the cortical region do not have a uniformly uniform shape (for example, oval and square), but have an irregular shape. For this reason, when the thickness is estimated by performing calculations for regions of all interfaces according to the standard, it is impossible to accurately analyze the thickness of the cortical region. Accordingly, the processor 110 may predict the thickness of the cortical region by reflecting the shapes, the relationship, and the like of the interfaces of the cortical region. The particular thickness estimating method will be described below with reference to FIGS. 2 and 3.

The processor 110 may perform segmentation of an organ of the body existing in the medical image through the neural network model trained with the characteristics of the input image. For example, the processor 110 may parcel respective detailed regions configuring the brain based on the three-dimensional T1 MR image, in which the brain is the target organ, by using the neural network model. In this case, the processor 110 may divide the three-dimensional T1 MR image that is the input image for training the neural network model into two-dimensional slices. The processor 110 may use some of the adjacent slices among the slices divided from the three-dimensional T1 MR image as the input of the neural network model. However, the processor 110 may also receive the two-dimensional slices, which have been already divided, from other terminal, without directly performing the foregoing operation of generating the slices.

The processor 110 may generate the mask from the medical image including at least one brain regions received from the network unit 150. The processor 110 may generate the mask for a specific brain region based on output data of the neural network model. For example, the processor 110 may generate segments of the medical image by using the neural network model, and extract a segment representing the cortical region among the segments of the medical image. The processor 110 may use the segment itself representing the cortical region as the mask for analyzing the thickness of the cortical region. The processor 110 may also generate the mask by extracting intensity of the cortical region by synthetizing the segment representing the cortical region and the original medical image.

According to the embodiment of the present disclosure, the memory 130 may store a predetermined type of information generated or determined by the processor 110 and a predetermined type of information received by a network unit 150.

According to the embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read- Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

The network unit 150 according to the embodiment of the present disclosure may use a predetermined form of wire/wireless communication system.

The technologies described in the present specification may be used in other networks, as well as the foregoing networks.

The network unit 150 may receive the medical image in which the organ of the body is expressed from a medical image photographing system. For example, the medical image in which the organ of the body is expressed may be data for learning or data for inferring of the neural network model. The medical image in which the organ of the body is expressed may be the three-dimensional T1 MR image including at least one brain region. The medical image in which the organ of the body is expressed is not limited to the foregoing example, and may include all of the images, such as X-ray images and CT images, related to the organ of the body obtained through the photographing.

Figure 2:
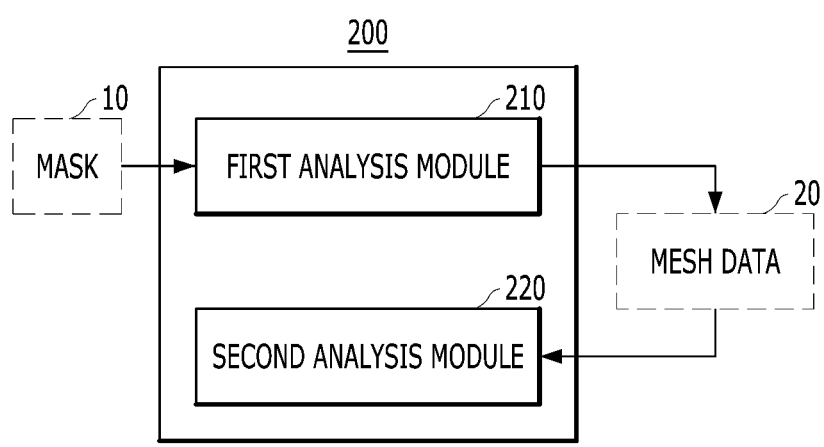
FIG. 2 is a block diagram illustrating a module of the computing device for analyzing a thickness of a cortical region according to the embodiment of the present disclosure.

FIG. 2 is a block diagram illustrating a module of the computing device for analyzing a thickness of a cortical region according to the embodiment of the present disclosure.

Referring to FIG. 2, the processor 110 may include a module 200 for analyzing a thickness of a cortical region. The thickness analysis module 200 may include a first analysis module 210 for analyzing the plurality of interfaces existing in the cortical region from the mask 10 in which at least one brain region is displayed, and a second analysis module 220 for receiving an output of the first analysis module 210 and predicting a thickness of the cortical region.

The first analysis module 210 may receive the mask 10 in which at least one brain region is displayed, and analyze each of the plurality of interfaces of the cortical region existing in the mask 10. The first analysis module 210 may extract two or more interfaces of the cortical region included in the mask 10 based on the brain structure, such as grey matter, white matter, and cerebrospinal fluid. For example, the interfaces of the cortical region extracted by the first analysis module 210 may include a first interface representing a boundary between the grey matter and the white matter in the cortical region, and a second interface representing a boundary between the grey matter and the cerebrospinal fluid.

The first analysis module 210 may extract each of the plurality of interfaces of the cortical region existing in the mask 10 as the data 20 in the form of mesh. The first analysis module 210 may identify each of the interfaces of the cortical region existing in the mask 10, and generate the mesh-type data 20 formed of a vertex and an edge for each of the interfaces. For example, the first analysis module 210 may generate first mesh data for the first interface and second mesh data for the second interface through the analysis of each of the interfaces. Through the generation of the mesh-type data 20, it is possible to maintain a structural characteristic of each of the interfaces of the cortical region having the complex structure and simplify data utilized for estimating the thickness at the same time. Accordingly, the generation of the mesh-type data 20 may decrease calculation complexity of the thickness estimation, thereby increasing operation efficiency in the thickness estimation process.

The second analysis module 220 may estimate the thickness of the cortical region based on the distance between the interfaces of the cortical region extracted from the mesh-type data 20. The second analysis module 220 may estimate the thickness for the whole brain cortical regions. Further, the second analysis module 220 may estimate the thickness of a part of the cortical region that is the target of interest. For example, the second analysis module 220 may estimate the thickness of the whole cortical regions based on a distance between the first mesh data for the first interface and the second mesh data for the second interface. The second analysis module 220 may also estimate the thickness of the part of the cortical region based on the region of interest of the first mesh data and a partial region of the second mesh data corresponding to the region of interest of the first mesh data. A result value output through the second analysis module 220 may be expressed by a numeral value together with the mask 10 of the cortical region for the original medical image.

Figure 3:
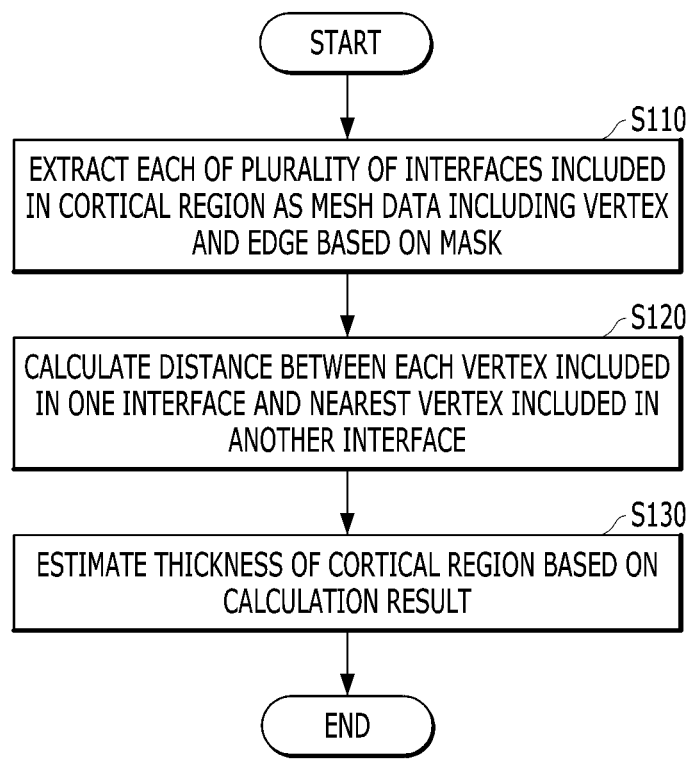
FIG. 3 is a flowchart illustrating a method of analyzing a thickness of a cortical region according to an embodiment of the present disclosure.

FIG. 3 is a flowchart illustrating a method of analyzing a thickness of a cortical region according to an embodiment of the present disclosure.

In operation S110, the computing device 100 may extract each of the plurality of interfaces included in a cortical region at once based on a mask of the cortical region. In this case, the plurality of interfaces may be extracted as mesh-type data including a vertex and an edge. In order to extract each interface as the mesh-type data including the vertex and the edge, the computing device 100 may use a marching cubes algorithm. The marching cubes algorithm is related to an algorithm generating a three-dimensional grid representation for an object included in the image. The computing device 100 may convert the representation of each interface of the cortical region into the mesh form formed of the vertex and the edge through the marching cubes algorithm.

In operation S120, the computing device 100 may estimate a distance between the vertices included in each of the plurality of interfaces in order to analyze the thickness of the cortical region. The computing device 100 may match the nearest vertex included in another interface for each of the vertices included in one interface, and calculate an Euclidean distance between the matched vertices. For example, the computing device 100 may match the vertex of the first mesh data for the first interface and the nearest vertex of the second mesh data for the second interface and calculate the distance between the vertices. On the contrary, the computing device 100 may also match the vertex of the second mesh data and the nearest vertex of the first mesh data and calculate the distance between the vertices.

In operation S130, the computing device 100 may estimate the thickness of the cortical region based on the distance between the vertices included in each of the plurality of interfaces. For example, the computing device 100 may estimate the thickness of the whole cortical region by performing the distance calculation on all of the vertices of the mesh data. Further, the computing device 100 may also estimate the thickness of at least one region of interest of the cortical region by performing the distance calculation on a specific vertex or some vertices of the mesh data. As described above, when the computing device 100 estimates the thickness by performing the distance calculation on all of the vertices, the calculation process for thickness estimation, which took tens of hours in the existing brain analysis software, may be significantly reduced to minutes.

Figure 4:
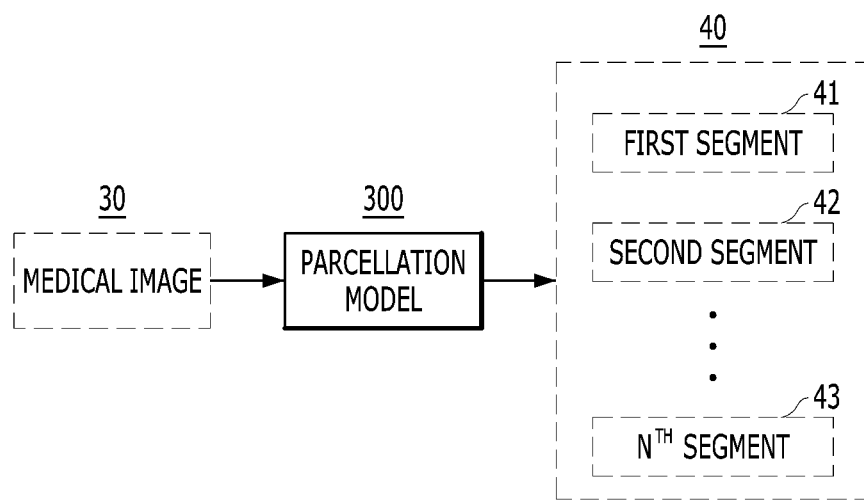
FIG. 4 is a block diagram illustrating a mask generating process of a neural network model of the computing device according to the embodiment of the present disclosure.

FIG. 4 is a block diagram illustrating a mask generating process of a neural network model of the computing device according to the embodiment of the present disclosure.

Referring to FIG. 4, the processor 110 of the computing device 100 according to the embodiment of the present disclosure may use a medical image 30 including at least one brain region as an input of a pre-trained parcellation model 300. For example, as the medical image 30 corresponding to the input of the parcellation model 300, the processor 110 may receive two-dimensional slices generated based on a three-dimensional image (for example, a T1 MR image). The processor 110 may receive the received two-dimensional slices through the network unit 150, and use the received two-dimensional slices as the input of the parcellation model 300.

The processor 110 may receive a three-dimensional medical image through the network unit 150 and autonomously generate the medical image 30 including two-dimensional slices through a pre-processing process. The pre-processing process may include a following example. For example, the processor 110 may receive the three-dimensional T1 MR image and perform normalization so that intensity of each voxel has a value within a predetermined range. In this case, the predetermined range may represent a value of 0 to 1. The processor 110 may perform augmentation on the normalized three-dimensional T1 MR image. In this case, the augmentation may include a method of randomly rotating the standardized image at a predetermined angle (for example, 15 degrees), a method of randomly adding extracted intensity to the standardized image.

The processor 110 may use one reference slice and the slices adjacent to the reference slice as the medical image 30 to be input to the parcellation model 300. The input of the parcellation model 300 may be a medical image including a plurality of channels. For example, the processor 110 may input the i−1$^{th}$, the i$^{th}$, and the i+1$^{th}$ (i is a natural number) axial slices among the plurality of slices generated from the three-dimensional T1 MR image to the channel of the parcellation model 300. The parcellation model 300 may receive a total of three slices based on the i$^{th}$ slice, and output the slice at the i$^{th}$ position including the segment data.

The processor 110 may parcel at least one brain region included in the medical image 30 into sub regions by using the parcellation model 300. The parcellation model 200 may receive the medical image 30, divide at least one brain region included in the medical image 30 into sub regions, and generate an output image 40 including the plurality of segment data 41, 42, and 43.

For example, the parcellation model 300 may receive the medical image 30 representing the whole brain region and parcel the brain region into sub regions including a cortical region and lower regions of the cortex. The first segment data 41 may be data representing a hippocampus. The second segment data 42 may be data representing an amygdala. N$^{th}$ segment data 43 may be data representing a cortex. In this case, the N$^{th}$ segment data 43 may also be data representing the whole cortical region, and may also be a set of segment data representing the sub regions (for example, entorhinal cortex and insula) of the cortex, respectively. The particular description of each of the segment data 41, 42, and 43 is merely illustrative, and the order and content of the segment data 41, 42, and 43 may be changed in accordance with the segmentation result.

Referring to FIGS. 2 and 4, the processor 110 may generate the mask 10 that is the input image of the first analysis module 210 based on one of the segment data 41, 42, and 43 of the output image 40. In this case, the generation of the mask 10 may mean the extraction of one of the segment data 41, 42, and 43 of the output image 40 and using the extracted one as it is or performing additional processing on the extracted one. For example, the processor 110 may extract the N$^{th}$ segment data 43 representing the cortical region from the output image 40 and generate the mask 10 for the cortical region as the input data of the first analysis module 210. The processor 110 may also generate the mask 10 for the cortical region by extracting the segment data representing the sub regions (for example, entorhinal cortex and insula) of the cortex, respectively, from the output image 40 and combining the extracted segment data. Further, the processor 110 may also generate the mask 10 by extracting the N$^{th}$ segment 43, and extracting intensity for the cortical region by matching the N$^{th}$ segment 43 and the medical image 30.

In the meantime, the parcellation model 300 according to the embodiment of the present disclosure may learn the characteristic of the input image by performing a first operation of training the neural network by randomly sampling the input image in which a label is present, and a second operation of training a second neural network by applying both the input image in which the label is present and an input image in which a label is not present. The parcellation model 300 may learn the characteristic of the medical image through the two-stage learning process of the neural network.

For example, the parcellation model 300 may select only the slices in which the label is present among the plurality of slices generated from the three-dimensional T1 MR image and train the convolutional neural network. The parcellation model 300 may perform an operation of randomly sampling the slices in the process of selecting only the slice in which the label is present, regardless of a subject. In this case, the parcellation model 300 may use a dice loss function and an adam optimizer for the learning of the first operation.

The parcellation model 300 may be the convolutional neural network trained by using all of the plurality of slices generated from the three-dimensional T1 MR image after the first operation. In the second operation, the input image including both the slice in which the label is present and the slice in which the label is not present may be used. In this case, the parcellation model 300 may use a cross entropy loss function and a stochastic gradient descent method for the learning of the second operation.

Referring to the foregoing example, in the training process of the parcellation model 300, the first operation and the second operation may be sequentially performed, and simultaneously, the first operation and the second operation may be performed based on different loss functions. The parcellation model 300 may be trained to improve a dice score by using the dice loss function in the first operation. Further, the parcellation model 300 may use the cross entropy loss function that is stable compared to the dice loss function while performing the second operation after the first operation. The two-stage learning method may reduce a learning rate in the second operation. Further, in the second operation process, it is possible to effectively decrease false positive without changing the parameter learned by the second neural network a lot through the first operation.

Figure 5:
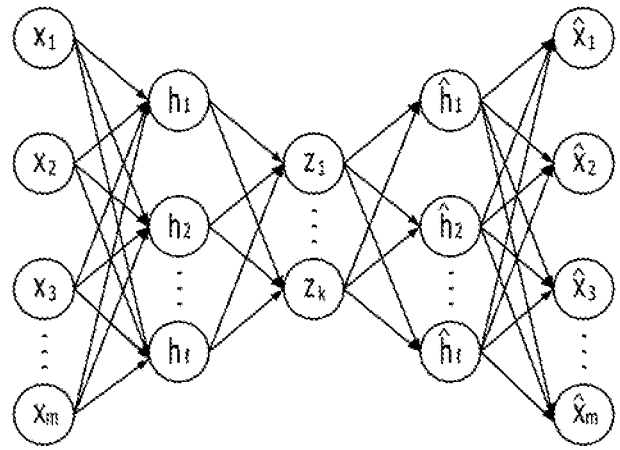
FIG. 5 is a schematic diagram illustrating a network function according to an embodiment of the present disclosure.

FIG. 5 is a schematic diagram illustrating a network function according to an embodiment of the present disclosure.

Throughout the present specification, a calculation model, a nerve network, the network function, and the neural network may be used with the same meaning. The neural network may be formed of a set of interconnected calculation units which are generally referred to as "nodes." The "nodes" may also be called "neurons." The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weights between the links are different, the two neural networks may be recognized to be different from each other.

The neural network may consist of a set of one or more nodes. A subset of the nodes forming the neural network may form a layer. Some of the nodes configuring the neural network may form one layer based on distances from an initial input node. For example, a set of nodes having a distance of n from an initial input node may form n layers. The distance from the initial input node may be defined by the minimum number of links, which need to be passed from the initial input node to a corresponding node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network, a Siamese network, and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of reducing or minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A variation rate of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the learning of the neural network, the training data may be generally a subset of actual data (that is, data to be processed by using the learned neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the learning process, a method using a bath normalization layer, and the like may be applied.

Figure 6:
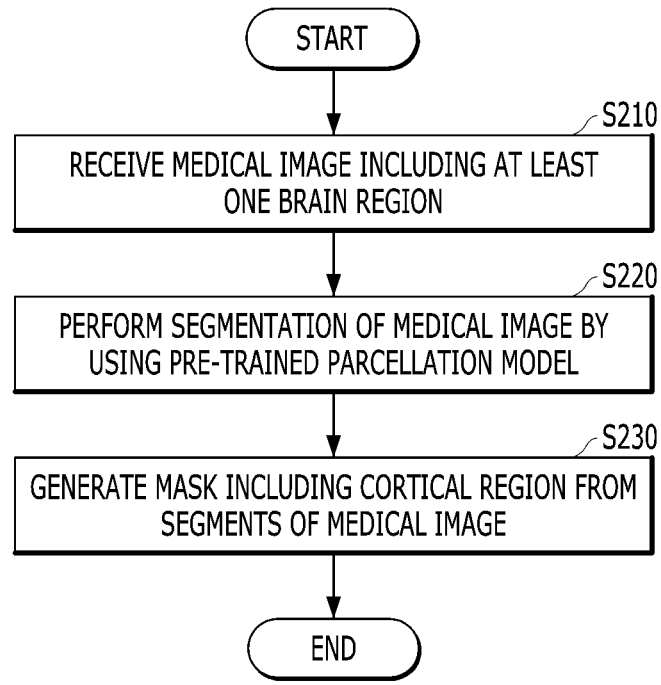
FIG. 6 is a flowchart illustrating an operation method of a parcellation model according to an embodiment of the present disclosure.

FIG. 6 is a flowchart illustrating an operation method of the parcellation model according to an embodiment of the present disclosure.

Referring to FIG. 6, in operation S120, the computing device 100 may receive a medical image including at least one brain region from a medical image photographing system. For example, the computing device 100 may receive a three-dimensional image (for example, a T1 MR image) representing the whole brain region and at least one two-dimensional slice from the network unit 150. The computing device 100 may use the medical image received through the network unit 150 as an input of a parcellation model. The computing device 100 may also additionally perform an operation of pre-processing the medical image before the input of the medical image into the parcellation model. For example, when the medical image is the three-dimensional image representing the whole brain region, the computing device 100 may perform the pre-processing operation of dividing the medical image into two-dimensional slices.

In operation S220, the computing device 100 may perform segmentation of the medical image by using the pre-trained parcellation model. The computing device 100 may generate the plurality of segments by parceling the input image in which the whole brain region is expressed into sub regions of the brain by using the parcellation model. For example, the computing device 100 may divide the whole brain region expressed in the input image of the parcellation model into a cortical region and lower regions of the cortex.

In operation S230, the computing device 100 may generate a mask including the cortical region based on the segments generated through operation S220. For example, the computing device 100 may extract a segment representing the cortical region among the segments and use the extracted segment as the mask as it is. The computing device 100 may also generate the mask by extracting a segment representing the cortical region, synthesizing the extracted segment and the input image of the parcellation model, and performing additional processing on the cortical region. When the entire brain region is completely divided into the sub regions of the brain cortex through the parcellation model, the computing device 100 may combine the segments representing the sub regions of the brain cortex and then perform the foregoing mask generating methods. The mask generated by the foregoing methods may be used for extracting an interface of the cortical region.

Figure 7:
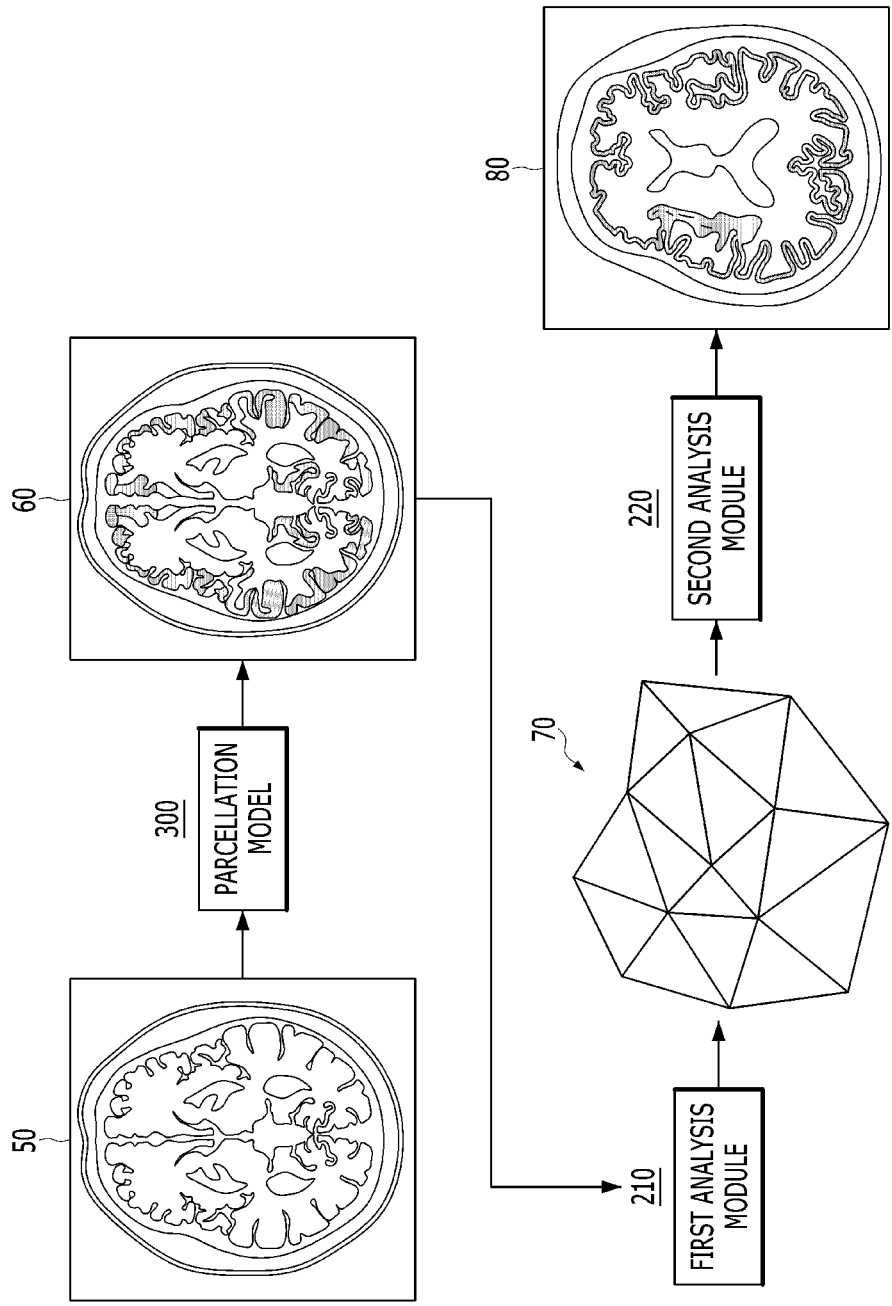
FIG. 7 is a conceptual diagram illustrating the method of analyzing the thickness of the cortical region according to the embodiment of the present disclosure.

FIG. 7 is a conceptual diagram illustrating the method of analyzing the thickness of the cortical region according to the embodiment of the present disclosure.

Referring to FIG. 7, the method of analyzing the thickness of the cortical region according to the embodiment of the present disclosure may include a process of segmenting the medical image by using the parcellation model 300 and a process of estimating a thickness of the cortical region by using the segmentation result. The computing device 100 may receive a medical image 50 in which the whole brain region is expressed, and divide the brain region included in the medical image 50 into sub regions by using the pre-trained parcellation model 300. In this case, an output image 60 of the parcellation model 300 may be used as an input of the first analysis module 210 for estimating the thickness of the cortical region.

The computing device 100 may generate a mask for the cortical region based on segments included in the output image 60 of the parcellation model 300. The first analysis module 210 may receive the mask generated from the output image 60 of the parcellation model 300 and extract the plurality of interfaces of the cortical region. In this case, the plurality of interfaces may be expressed as data 70 in the form of a mesh including vertices and edges.

The second analysis module 220 may receive the data 70 in the form of the mesh for each of the plurality of interfaces and estimate the thickness of the cortical region. The second analysis module 220 may estimate the thickness of the cortical region by calculating a distance between a vertex included in the data 70 in the form of the mesh for one interface and the nearest vertex included in the data 70 in the form of the mesh for another interface. The output data 80 of the second analysis module 220 may be data including information on a thickness of the mask in which the cortical region is emphasized and indicated.

Figure 8:
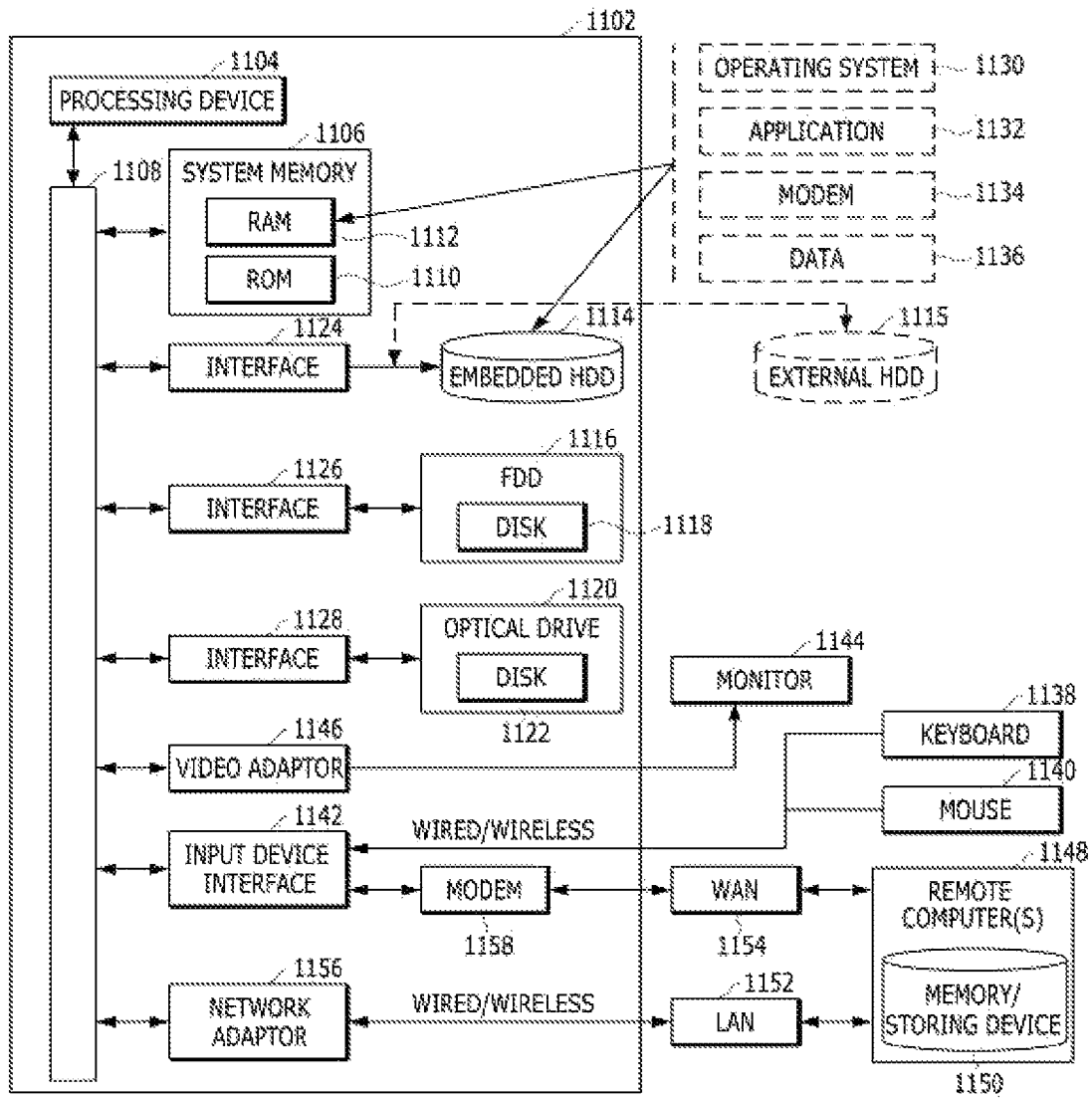
FIG. 8 is a block diagram illustrating a computing device according to an embodiment of the present disclosure.

FIG. 8 is a simple and normal schematic view of a computing environment in which the embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer (s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is an example and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various logical blocks, modules, processors, means, circuits, and algorithm steps described in association with the embodiments disclosed herein may be implemented by electronic hardware, various types of programs or design codes (for easy description, herein, designated as software), or a combination of all of them. In order to clearly describe the intercompatibility of the hardware and the software, various components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, an apparatus, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be interpreted within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for analyzing a thickness of a cortical region, performed by a computing device including one or more processors, the method comprising:
    extracting a plurality of interfaces included in a cortical region based on a mask generated from a medical image including at least one brain region; and
    estimating a thickness of the cortical region based on the plurality of interfaces,
    wherein the extracting the plurality of interfaces included in the cortical region comprises:
    extracting each of the plurality of interfaces as mesh data including a vertex and an edge based on the mask,
    wherein the estimating the thickness of the cortical region based on the plurality of interfaces comprises:
    estimating the thickness of the cortical region based on a distance between vertices included in each of the plurality of interfaces.

2. The method of claim 1, further comprising:
    generating the mask including the cortical region from the medical image using a pre-trained parcellation model.

3. The method of claim 2, wherein the parcellation model is a convolutional neural network trained by receiving at least one two-dimensional slice generated from a three-dimensional image.

4. The method of claim 1, wherein the plurality of interfaces comprises:
    a first interface indicating a boundary between gray matter and white matter in the cortical region; and
    a second interface indicating a boundary between the gray matter and cerebrospinal fluid in the cortical region.

5. The method of claim 1, wherein the mesh data is extracted using a marching cubes algorithm.

6. The method of claim 1, wherein the estimating the thickness of the cortical region based on the distance between the vertices included in each of the plurality of interfaces comprises:
    calculating a distance to the nearest vertex included in the other interface for each of vertices included in one interface; and
    estimating the thickness of the cortical region based on the result of the calculation.

7. A computer program stored in a computer-readable storage medium, wherein the computer program, when executed on one or more processors, causes the following operations to be performed for analyzing a thickness of a cortical region, the operations comprising:
    extracting a plurality of interfaces included in a cortical region based on a mask generated from a medical image including at least one brain region; and
    estimating a thickness of the cortical region based on the plurality of interfaces,
    wherein the extracting the plurality of interfaces included in the cortical region comprises:
    extracting each of the plurality of interfaces as mesh data including a vertex and an edge based on the mask,
    wherein the estimating the thickness of the cortical region based on the plurality of interfaces comprises:
    estimating the thickness of the cortical region based on a distance between vertices included in each of the plurality of interfaces.

8. A device for analyzing a thickness of a cortical region, comprising:
    a processor including at least one core;
    a memory including program codes executable in the processor; and
    a network unit for receiving a medical image including at least one brain region,
    wherein the processor is configured to:
    extract a plurality of interfaces included in a cortical region based on a mask generated from the medical image including at least one brain region;
    estimate a thickness of the cortical region based on the plurality of interfaces;
    extracting each of the plurality of interfaces as mesh data including a vertex and an edge based on the mask; and
    estimating the thickness of the cortical region based on a distance between vertices included in each of the plurality of interfaces.

9. The device of claim 8, wherein the processor is further configured to:
    generate the mask including the cortical region from the medical image using a pre-trained parcellation model.

10. The device of claim 9, wherein the parcellation model includes a convolutional neural network trained by receiving at least one two-dimensional slice generated from a three-dimensional image.

11. The device of claim 8, wherein the plurality of interfaces includes:
    a first interface indicating a boundary between gray matter and white matter in the cortical region; and
    a second interface indicating a boundary between the gray matter and cerebrospinal fluid in the cortical region.

12. The device of claim 8, wherein the mesh data is extracted using a marching cubes algorithm.

13. The device of claim 8, wherein the estimating the thickness of the cortical region based on the distance between the vertices included in each of the plurality of interfaces includes:
    calculating a distance to the nearest vertex included in the other interface for each of vertices included in one interface.

14. The device of claim 13, wherein the estimating the thickness of the cortical region based on the distance between the vertices included in each of the plurality of interfaces further includes:
estimating the thickness of the cortical region based on the result of the calculation.

* * * * *